United States Patent
Torno et al.

(10) Patent No.: US 7,305,296 B2
(45) Date of Patent: Dec. 4, 2007

(54) DEVICE AND METHOD FOR PROCESSING DATA THAT ARE OBTAINED BY SAMPLING AN ANALOG SIGNAL

(75) Inventors: Oskar Torno, Schwieberdingen (DE); Carsten Kluth, Stuttgart (DE); Werner Haeming, Neudenau (DE); Federico Buganza, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 11/494,031

(22) Filed: Jul. 26, 2006

(65) Prior Publication Data

US 2007/0185663 A1 Aug. 9, 2007

(30) Foreign Application Priority Data

Jul. 28, 2005 (DE) ............... 10 2005 035 407

(51) Int. Cl.
*G00F 19/00* (2006.01)

(52) U.S. Cl. .............. 701/101; 701/111; 73/35.01

(58) Field of Classification Search .............. 701/101, 701/102, 111, 114, 115; 73/35.01
See application file for complete search history.

(56) References Cited

U.S. PATENT DOCUMENTS

| 5,088,044 | A * | 2/1992 | Matsuura ................ 701/111 |
| 6,750,798 | B2 * | 6/2004 | Honda ................... 701/111 |
| 6,845,312 | B1 * | 1/2005 | Cross et al. ............ 701/111 |
| 2003/0128405 | A1 | 7/2003 | Tay | |

FOREIGN PATENT DOCUMENTS

| DE | 19829214 | 2/1999 |
| DE | 101 50 377 | 4/2003 |

* cited by examiner

*Primary Examiner*—Hieu T. Vo
(74) *Attorney, Agent, or Firm*—Kenyon & Kenyon LLP

(57) ABSTRACT

A device and a method for processing data, in particular measuring data of a knock sensor of an internal combustion engine, are provided, the data being obtained by sampling an analog signal. The sampled values are combined to form data blocks and then processed as data block by a computing device.

8 Claims, 1 Drawing Sheet

DEVICE AND METHOD FOR PROCESSING DATA THAT ARE OBTAINED BY SAMPLING AN ANALOG SIGNAL

BACKGROUND INFORMATION

From German Patent No. DE 10150377, devices and methods for the decentralized processing of data are described in which sampling of an analog signal by a local electronic system takes place. These data are then forwarded to a computing device. The processing of these data subjects the computing device to a heavy loading.

SUMMARY OF THE INVENTION

In contrast, the device according to the present invention and the method according to the present invention have the advantage of reducing the loading of the processing computing device. Due to the block-type forwarding of the sampling values, there is less work for the processing computing device and the computing capacity is reserved for other tasks as a result.

An especially uncomplicated grouping of the sampling values into data blocks comes about by providing a first and a second memory area, which are alternately utilized for storage. If these memories are designed as ring buffer stores, a very simple administration with regards to the already read-out data may take place. The fetching of the data may also be implemented by the processing computing device itself, which allows it to shift the fetching of the data to an advantageous time.

DETAILED DESCRIPTION

Figure 1:
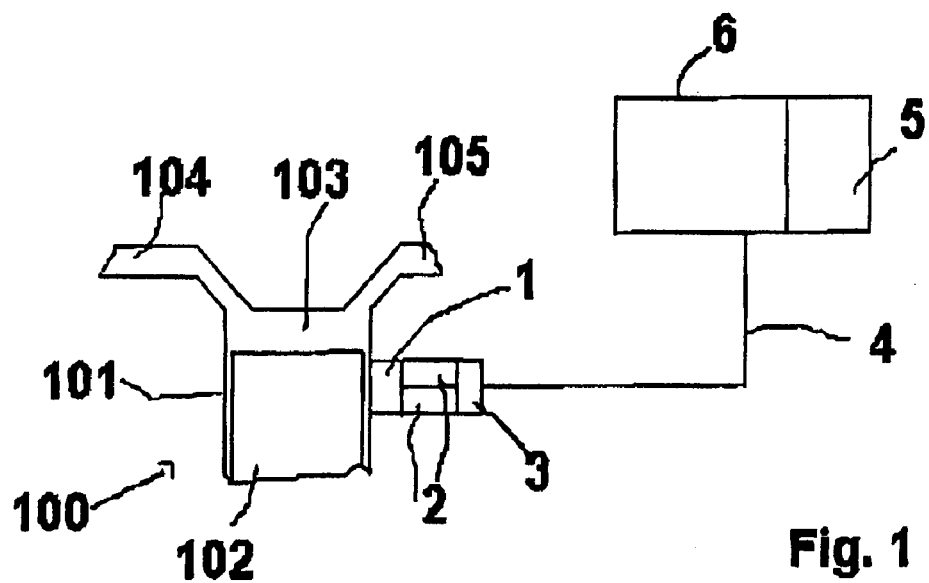
FIG. 1 shows an internal combustion engine having a knock sensor and a processing computing device.

FIG. 1 schematically shows an internal combustion engine 100, which has a cylinder 101 in which a piston 102 is situated. The space of cylinder 101 not taken up by piston 102 forms a combustion chamber 103 into which air is introduced by an air supply 104. Furthermore, a fuel such as gasoline is introduced into combustion chamber 103, and the combustible mixture of gasoline and air formed in this manner is combusted in combustion chamber 103. This combustion generates pressure by which a displacement of piston 102 is converted into motion. The exhaust gases of this combustion are removed from combustion chamber 103 by an exhaust pipe 105. Further details of this internal combustion engine 100 such as air intake valves, gas discharge valves, injection valves, spark plugs and the like are not shown in FIG. 1 for reasons of simplification. This is a conventional Otto spark ignition engine, preferably a gasoline engine.

Disposed on the outside of cylinder 101 are a knock sensor and a processing electronic system 1, which are referred to as a sensor module in the following text. The knock sensor is typically embodied as a piezoelectric sensor, which supplies an analog output voltage as a function of a vibration or acceleration signal of cylinder 101. An analog-digital converter converts this analog output voltage of the piezoelectric sensor into a digital signal. The data obtained in this manner are stored in two memory blocks 2, and interface 3 then transmits the data to processing computing device 5 in a control device 6 in a block-wise manner, i.e., after combining a plurality of converted sampling values, via data line 4. Processing computing device 5 may be, for instance, an engine controller, which makes corresponding modifications in the control of internal combustion engine 100 on the basis of the knock signals.

The sampling of the sensor signals from the knock sensor is carried out at a relatively high sampling rate in the order of magnitude of approx. 100 kHz. This consequently requires that a measuring value be sampled and stored every 10 microseconds (µs). If this value were directly forwarded to computing device 5, computing device 5 would have to interrupt the processing of the normal program every 10 microseconds in order to process this new sampling value in some manner. However, this interruption of the normal program constitutes extra work for processing computing device 5 since at least a few values of the normal running program must be safeguarded in corresponding buffer stores. Too many interruptions of the running program, in the order of magnitude of every 10, microseconds, would therefore constitute a waste of computing capacity of computing device 5. According to the present invention, it is therefore provided that the sampling values of the knock sensor are combined to form data packets of a useful size, in the order of magnitude of 20-100 data items, and these data are then forwarded as a block.

Two memory blocks 2, which are written to alternately, are provided for buffer-storing the data. One procedure involves signal-processing device 1 filling one data block 2 completely with sampling values, and interface 3 sending a corresponding interrupt signal to computing device 5 as soon as a full memory area is detected. Due to this interrupt signal, computing device 5 then interrupts its processing of the current program and reads in the data values from full memory area 2. These data are made available to it by interface 3 and transmitted via line 4. During this time additional sampling values are continuously stored in the other memory area. This transmission of the data blocks from memory areas 2 to computing device 5 takes up much less time than the time period that is required to compile the data of the data block. After transmission of the data block, computing device 5 continues with the processing of the currently running program until an additional memory area 2 is completely filled with sampling values at a later point in time.

So-called ring buffer stores are especially suitable for storing. Such ring buffer stores have a pointer that points to the next memory area to be written to or to the next memory area to be read out. When writing in the data, it is therefore very easy to determine when one of memory areas 2 is filled with sampling values, i.e., whenever the pointer pointing to the next memory area to be written to has reached a corresponding setpoint value. Conversely, when transmitting the data to computing device 5, it is easily determined when all data of the corresponding memory area have been transmitted, i.e., whenever the read pointer points to a predefined first memory location of the particular memory area. Thus, both the writing of the sampling values to memory 2 and the block-wise reading-out and the transmission of the memory values to computing device 5 is simplified.

Figure 2:
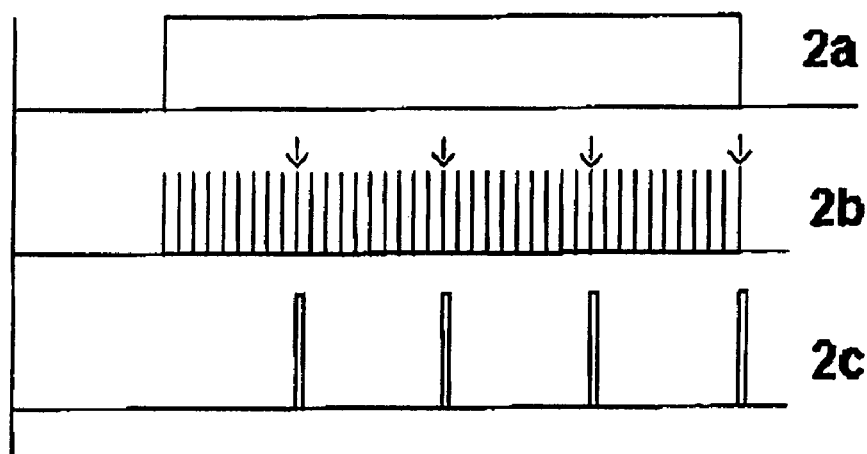
FIG. 2 shows the time characteristic of signal profiles of the device for the processing of data, or of the processing computing device.

FIG. 2 shows various signal characteristics in schematic form. FIG. 2a schematically illustrates a time window for measuring a knock signal, which is indicated by a high level of the signal shown in FIG. 2a. Due to this high level, which is generated by computing device 5, for instance, the knock sensor and the local electronic system are induced to measure knock signals. Shown in FIG. 2b are the sampling instants, i.e., sampling of the analog voltage level of the piezoelectric knock sensor takes place at every pulse shown in FIG. 2b. Each value sampled in this manner is then stored in memory 2. The storing of the values initially takes place in one of the memory areas until this memory area 2 is full. FIG. 2b illustrates individual signals (represented by the arrows) by which it is indicated that the particular memory area is full. An interrupt then occurs via interface 3, and a time window is generated in which the content of the respective full memory area is transmitted to computing device 5. FIG. 2c shows the time window for the data transmission. Whenever the level as shown in FIG. 2c is at a high level, interface 3 transmits data to computing device 5. As can be gathered from FIG. 2, the time period during which the data transmission takes place is relatively short compared to the time interval of these transmission windows. This means that computing device 5 may be utilized to process other programs in the meantime, so that the processing of these programs is affected only negligibly.

The present invention has been described using the example of a knock sensor of an internal combustion engine. However, the method according to the present invention or the device according to the present invention is generally suitable for any type of data for which a multitude of sampling values is to be forwarded to a computing device for further processing. To relieve the computing device from the pure compilation of data, the data are combined into blocks and then transmitted to the computing device in a block-wise manner. Naturally, this method is particularly useful in the context of motor vehicles since a multitude of sensor values is detected there, and complex evaluation programs must be processed simultaneously.

Figure 3:
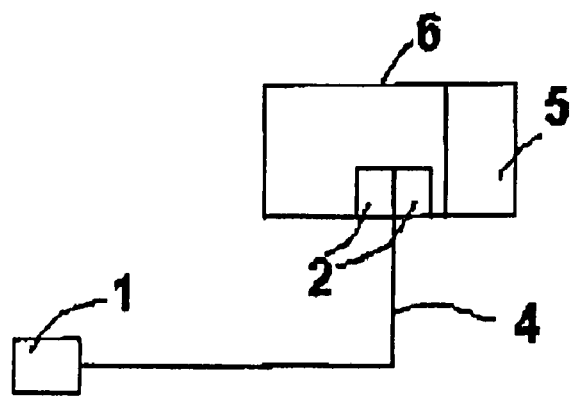
FIG. 3 shows another exemplary embodiment of the present invention.

FIG. 3 shows another exemplary embodiment of the present invention. The reference numerals once again denote the same items as in FIG. 1, but the motor is no longer shown. No memory 2 for the measuring values is assigned to sensor module 1 directly, but corresponding memory areas 2 are provided in control device 6 instead. Within the measuring window as shown in FIG. 2a, sensor module 1 generates a continuous flow of data values as described in connection with FIG. 2b. These values are sequentially stored in a first memory area 2. However, the functions that were carried out by the interface in FIG. 1 in this case are assumed by computing device 5. Either a hardware module, which generates an interrupt signal when the first of the two memory areas 2 is filled up with data, is provided in computing device 5, or a monitoring program, which is running in the processor core, checks the content of memory area 2 from time to time and then initiates corresponding processing of the data stored in the respective memory area 2. Since the processing of the data blocks stored in the respective memory areas 2 takes less time than the compilation of the data in memory areas 2, this once again corresponds to FIG. 2c, with the exception that the illustrated time windows do not refer to the transmission of the data to computing unit 5, but to the processing of the data from the respective memory area 2 of control device 6. The fetching and the processing of the data blocks by a program running in computing device 5 is especially simple if memory areas 2 are formed as ring buffer stores. It is then merely necessary that a monitoring program queries the pointers that point to the next memory area to be described or read out. It can then be determined in an uncomplicated manner whether one of memory areas 2 is filled up with data and processing of a data block should take place as a result.

What is claimed is:

1. A device for a processing of data, comprising:
   an arrangement for obtaining the data by sampling an analog signal;
   an arrangement for combining a plurality of sampling values to form a data block;
   an arrangement for forwarding the data block; and
   a computing device for further processing the forwarded data block.

2. The device according to claim 1, wherein the device is for measuring data of a knock sensor of an internal combustion engine.

3. The device according to claim 1, further comprising first and second memory areas, the sampling values being alternately stored in the first and second memory areas, a switch to a respective other memory area taking place when the sampling values for a data block have been stored in the first or second memory area.

4. The device according to claim 3, wherein the first and second memory areas include ring buffer stores.

5. A method for a processing of data, comprising:
   obtaining the data by sampling an analog signal;
   combining a plurality of sampling values to form a data block;
   forwarding the data block to a computing device; and
   further processing the forwarded data block by the computing device.

6. The method according to claim 5, wherein the method is for measuring data of a knock sensor of an internal combustion engine.

7. The method according to claim 5, further comprising alternately storing the sampling values in first and second memory areas, a switch to a respective other memory area taking place when the sampling values for a data block have been stored in the first or second memory area.

8. The method according to claim 7, wherein the first and second memory areas include ring buffer stores.

* * * * *